Sept. 30, 1969     K. DEURING ET AL     3,469,856

JAW CHUCK

Filed May 19, 1966     2 Sheets-Sheet 1

Sept. 30, 1969    K. DEURING ET AL    3,469,856
JAW CHUCK

Filed May 19, 1966                    2 Sheets-Sheet 2

United States Patent Office 3,469,856
Patented Sept. 30, 1969

3,469,856
JAW CHUCK
Karl Deuring, Dusseldorf, and Hans Scharfen, Buderich, Germany, assignors to Paul Forkardt Kommanditgesellschaft, Dusseldorf, Germany
Filed May 19, 1966, Ser. No. 551,448
Claims priority, application Germany, May 22, 1965, F 46,128
Int. Cl. B23b 31/16, 5/22, 5/34
U.S. Cl. 279—119                            4 Claims

ABSTRACT OF THE DISCLOSURE

Operating structure for chucks having plural jaws movable radially in response to axial reciprocation of a central sleeve transmitting force to angle levers journalled by the jaws. Each jaw has side walls in which transverse bores provide coaxial recesses for journalling pivot portions of the levers, one side wall having a slot extending from one bore recess to an outward jaw end able to receive a respective lever arm of one angle lever during pivotal assembly to each other. The lever pivot portions include a groove and keyway end interfit to a pivot means carried in the chuck body so that an axis offset eccentrically from that of lever pivot portions is formed at lever arm length capable of variation in force transmitting capability during maintenance of lever arm strength of the angle levers.

---

The present invention concerns a centrically clamping jaw chuck the jaws of which are actuated through an angle lever by a centrally axially movable piston shaped sleeve means.

Heretofore known lever chucks of this type have the drawback that the power transmission from the lever to the jaw is effected only along a line. Inasmuch as the force is considerable at this point, high specific pressure occurs and there exists the danger of a fast wear and loss in precision. Moreover, the heretofore known structures of the type involved make it necessary for different transmission ratios to employ different levers which represents a drawback with regard to an economical production.

It is, therefore, an object of the present invention to provide a jaw chuck of the above mentioned general type which will overcome the drawbacks outlined above.

It is another object of this invention to provide a jaw chuck as set forth above, which will permit a simple journalling of the angle lever with power transmission to the jaw through surfaces and which will also permit a simple assembly of the chuck.

Still another object of this invention consists in the provision of a chuck as set forth in the preceding paragraphs, which will permit the assembly of chucks of different sizes by means of the same group of jaws and levers.

These and other objects and advantages of the invention will appear more clearly from the following specification in connection with the accompanying drawings, in which.

Figure 1:
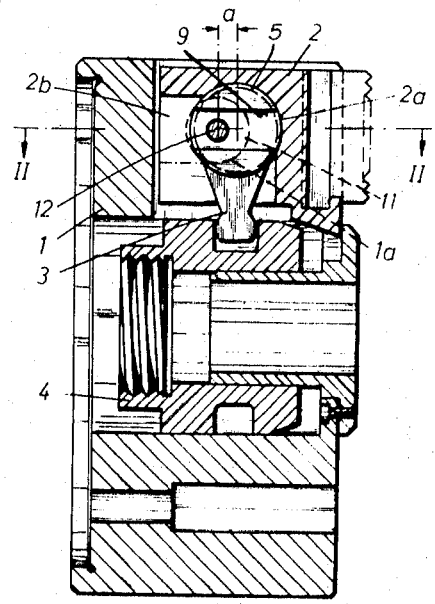
FIG. 1 is a longitudinal section through a chuck according to the invention.

A chuck according to the present invention is characterized primarily in that each angle lever is supported by means of two coaxial cylindrical pivots or studs journalled in a continuous bore of the chuck jaw pertaining thereto. According to the present invention, the back side of the jaw is recessed for the long arm of the angle lever while one of the two remaining walls of the jaw is modified from the pivot bore toward the rear due to being cut open by approximately half the width of the long lever arm. With such a structure, the angle lever is adapted with its rearwardly pointing long lever arm in the axial direction of its pivots to be inserted into the jaw as cut open whereupon it can be tilted pivotally to its working position so that a very simple assembly will be assured.

The end faces of the two pivots formed by stud pivotal portions of the angle lever are provided with symmetrical transverse grooves which advantageously, in the central position of the lever, extend perpendicularly to the direction of movement of the jaws. These grooves of the lever pivot portions are inserted into mating engagement with corresponding transverse wedges which are parallel to the pivot axis of the lever. These transverse wedges are located at the end faces of two cylindrical bearing bolts. These bearing bolts are rotatable in a tangential bore of the chuck body which bore is parallel to the axis of the pivot of the angle lever. The said bore is offset in axial direction of the chuck by the length of the desired short arm of the angle lever. The said bearing bolts are secured against displacement.

This design of the chuck and the lever affords the possibility of employing the same building elements for obtaining lever transmission ratios which differ in size and/or direction. To this end, it is merely necessary to provide the bolt bores in the chuck with a different distance from the angle lever axis. Finally, for the same purpose of obtaining different lever transmission ratios, it is also possible to arrange the bearing bolts eccentrically in rotatable supporting bushings which in their turn are rotatable in the bore of the chuck body so that one and the same chuck can alternately be worked with different transmission ratios and/or transmitting devices.

Referring now to the drawings in detail, the chuck body 1 comprises in a manner known per se base chuck jaws 2 each having arranged therein an angle lever 3. The long arms of these angle levers 3 engage the central axially movable piston shaped sleeve means 4 by the displacements of which the chuck jaws are radially displaced.

Figure 5:
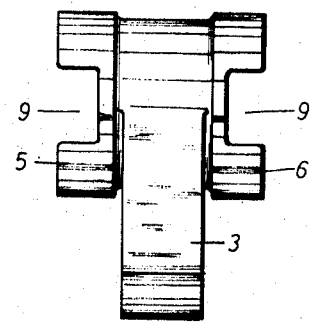
FIG. 5 shows the angle lever on a larger scale than the scale of FIGS. 1 to 4.

Each angle lever 3 has two coaxial cylindrical pivots formed by stud pivoted portions 5 and 6 (FIG. 5) which are journalled in the continuous bore 2a of the chuck jaw pertaining thereto. Jaw 2 has its back side for the long arm of angle lever 3 provided with a recess 2b while one of the two remaining walls of chuck jaw 2 is cut open from the pivot bore in rearward direction by about the width of the long lever arm. In this way, the angle lever 3 with rearwardly pointing long arm (toward the left with regard to FIG. 1) can be inserted in the direction of the stud pivotal portions into jaw 2 and then can be tilted downwardly into its pivotal working position.

The end faces of the two portions forming studs or pivots 5 and 6 of angle lever 3 are provided with symmetric transverse grooves 9 in such a way that these transverse grooves, in the central position of the piston shaped sleeve means 4 (FIG. 1), are approximately perpendicular to the direction of movement of the jaws and into which grooves 9 transverse wedges or keys 10 are inserted parallel to the pivot axis. These transverse keys are arranged at the end faces of two cylindrical bearing bolts 11. The said bearing bolts are rotatable in a tangential bore 1a of the chuck body 1 (FIG. 1) which bore is parallel to the pivot axis of the angle lever 3 but is offset in axial direction of the chuck by the length of the desired short arm *a* of the angle lever 3. These bearing bolts 11 pertaining to a lever are held together to the angle lever 3 by means of a screw 12. The shank of screw 12 is somewhat thicker than the threaded portion, and the depth of the counter-sink for the screw head is so dimensioned that when tightening the screw 12, some play remains below its head so that the two bearing bolts 11 will not firmly be tightened against said angle lever 3.

When piston shaped sleeve means 4 of the chuck is displaced from its FIG. 1 position toward the left, the angle lever 3 turns in clockwise direction about the axis of bore 1*a*. As a result thereof, the small angle lever arm *a* becomes effective whereby the jaw 2 will be radially inwardly displaced.

Figure 2:
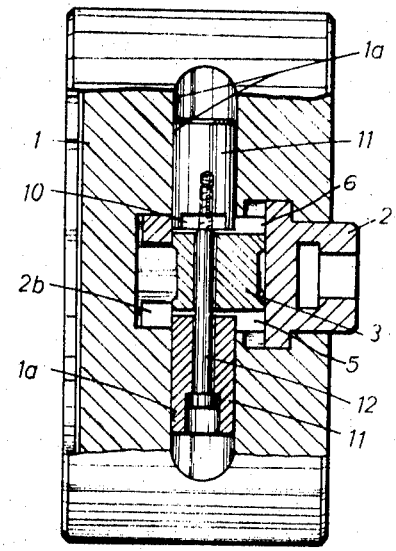
FIG. 2 represents a section taken along the line II—II of FIG. 1.
Figure 3:
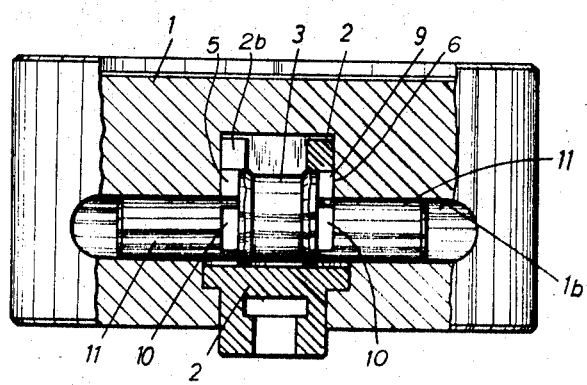
FIG. 3 is a section similar to that of FIG. 1 but with a different journalling for the bearing bolts.

FIGS. 2 and 3 indicate that by means of the same jaws and levers and also when employing the same piston, it is possible to obtain different lever transmission ratios in different jaw bodies which differ from each other by the location of the chuck bores 1*a*, 1*b*. When in conformity with FIG. 3 the axis of the jaw bore 1*b* in the body is located ahead of the axis of the lever bearing in the jaw, a pulling movement of the piston shaped sleeve means will not produce a movement of the jaw inwardly but such movement in outward direction. Such a device can be advantageous when a chuck is used primarily for clamping in outward direction.

Figure 4:
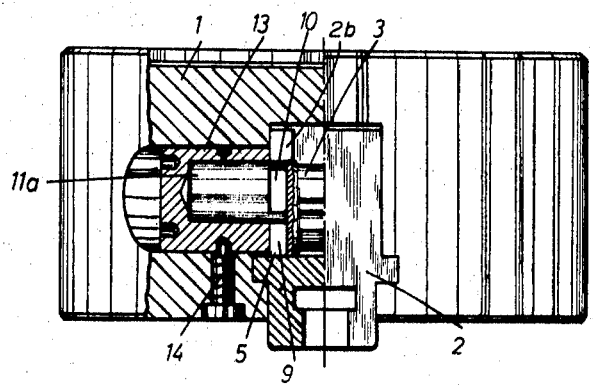
FIG. 4 shows the journalling of the bearing bolts in an eccentric bushing.

The possibility of changing the size and direction of the transmission ratio can be taken advantage of by larger chucks, especially by those with power drive which is effective in one direction only. To this end, the bearing bolts are adjustably arranged in the chuck body so that for each jaw the necessary direction of movement of the jaws and the most favorable transmission ratio can be selected. For this purpose, the bearing bolts 11*a* are in conformity with FIG. 4 journalled not directly in the chuck body 1 but in special supporting bushings 13 which are eccentrically drilled out for the bearing pivots formed by stud pivoted portions 5 and 6. These bearing bushings 13 are in their turn rotatable in the chuck body 1 and can be held in their respective position by means of screws 14. With such an arrangement it is possible for instance by turning the supporting bushings 13 by 180° to effect the change from an outer clamping to an inner clamping or vice versa without changing the driving direction by the piston shaped sleeve means 4. The intermediate positions of the supporting bushings permit any desired reduction in the short lever arm and a corresponding increase in the transmission ratio.

It is, of course, to be understood that the present invention is, by no means, limited to the particular arrangements shown in the drawings but also comprises any modifications within the scope of the appended claims.

What we claim is:

1. A centrically clamping chuck which comprises in combination: a substantially cylindrical chuck body; a plurality of jaws substantially evenly distributed over and radially movably mounted in said chuck body; reciprocable piston shaped sleeve means arranged within said chuck body and substantially coaxially therewith; and a plurality of angle levers including arms respectively operatively interconnecting said jaws and said piston shaped sleeve means and operable in response to an axial movement of said piston shaped sleeve means to move said jaws in radial direction; each of said jaws being provided with two axially aligned bores the axis of which extends in a direction transverse to the direction of radial movement of said jaws; each of said angle levers including pivot portions slidably engaging the jaw pertaining thereto, each of said angle levers including a lever arm connected to said pivot portions and operatively engaging said piston shaped sleeve means, and two axially aligned pivots eccentrically offset as connected to said pivot portions and pivotally journalled to one side in the axially aligned bores of the respective jaw pertaining to said lever arm; each of said jaws having a front side facing the work piece to be chucked and also having a rear side opposite said front side, and furthermore having a pair of side walls substantially perpendicular to the axially aligned bores therein and defining said bores; said rear side of one wall being recessed so as to be able to receive the respective lever arm pertaining thereto; and said one side wall having a slot extending from said one bore to the rear end of said side wall, the width of said slot being at least slightly in excess of the thickness of the respective adjacent lever arm.

2. A chuck according to claim 1, in which the two axially aligned pivots of each angle lever are formed by pins and in which the end faces of said pivot portions of each angle lever and the respective adjacent end faces of said pins engage each other in a groove and keyway, and fasteners maintaining interfit of said pivot portions and pins of the respective angle lever.

3. A chuck according to claim 2, in which the total width of said angle lever including said pivot portions is within the width of the respective jaw supporting same.

4. A chuck according to claim 1, in which the axially aligned bores in said jaws journal bushing means carrying said pivots as bearings eccentrically and adjustably mounted in said jaws.

References Cited

UNITED STATES PATENTS

| | | | |
|---|---|---|---|
| 1,711,787 | 5/1929 | Hopkins | 279—119 |
| 2,224,639 | 12/1940 | Ward | 279—119 |

ROBERT C. RIORDON, Primary Examiner

DAVID R. MELTON, Assistant Examiner